United States Patent
Lyman et al.

(10) Patent No.: US 8,902,086 B1
(45) Date of Patent: Dec. 2, 2014

(54) DATA ENCODING FOR ANALYSIS ACCELERATION

(71) Applicant: Allegiance Software, Inc., South Jordan, UT (US)

(72) Inventors: Brett J. Lyman, South Jordan, UT (US); Jason H. Taylor, Lehi, UT (US); Alberto F. Nevarez, San Carlos, CA (US)

(73) Assignee: Allegiance Software, Inc., South Jordan, UT (US)

( * ) Notice: Subject to any disclaimer, the term of this patent is extended or adjusted under 35 U.S.C. 154(b) by 0 days.

(21) Appl. No.: 14/023,739

(22) Filed: Sep. 11, 2013

(51) Int. Cl.
*H03M 7/00* (2006.01)
*G06F 17/30* (2006.01)

(52) U.S. Cl.
CPC .... *G06F 17/30705* (2013.01); *G06F 17/30985* (2013.01)
USPC .............................................. 341/50; 341/51

(58) Field of Classification Search
CPC ... H03M 7/30; H03M 7/3077; H03M 7/3084; H03M 7/3086; G06F 17/30705; G06F 17/30985
USPC ...................................................... 341/50, 51
See application file for complete search history.

(56) References Cited

U.S. PATENT DOCUMENTS

| | | | |
|---|---|---|---|
| 5,717,393 A * | 2/1998 | Nakano et al. | 341/50 |
| 8,044,829 B2 * | 10/2011 | Chen et al. | 341/51 |
| 8,631,020 B2 * | 1/2014 | Callaghan et al. | 707/752 |
| 8,768,899 B2 * | 7/2014 | Faerber et al. | 707/693 |

* cited by examiner

*Primary Examiner* — Khai M Nguyen
(74) *Attorney, Agent, or Firm* — Kunzler Law Group

(57) ABSTRACT

For encoding data for analysis acceleration, a method calculates a classification set for a data group of a data set including a plurality of entries. The classification set includes a finite plurality of classification values. Each classification value is associated with a bit position in a data binary string of a specified binary length. The method further encodes each data value of the data group for each entry with one of the plurality of classification values in a corresponding data binary string for the entry.

20 Claims, 8 Drawing Sheets

205

| | Data Group 1 210a | Data Group 2 210b | Data Group 3 210c | Data Group 4 210d |
|---|---|---|---|---|
| Entry 1 215a | Brown | 14 | 3 | (201) 797-2093 |
| Entry 2 215b | Black | 6 | 8 | (510) 466-3562 |
| Entry 3 215c | Yellow | 45 | 4 | (271) 435-0496 |
| Entry 4 215d | Brown | 41 | 2 | (408) 810-1124 |
| Entry 5 215e | Blue | 11 | 7 | (415) 766-4039 |
| Entry 6 215f | Red | 35 | 4 | (801) 752-8350 |
| Entry 7 215g | White | 57 | 8 | (703) 344-5678 |
| Entry 8 215h | Orange | 19 | 3 | (403) 979-8864 |

| Data Group Values | Classification Values | Bit Position |
|---|---|---|
| Color | White | 0 |
| Color | Black | 1 |
| Color | Red | 2 |
| Color | Orange | 3 |
| Color | Brown | 4 |
| Color | Yellow | 5 |
| Minutes | 0-9 | 6 |
| Minutes | 10-19 | 7 |
| Minutes | 20-29 | 8 |
| Minutes | 30-39 | 9 |
| Minutes | 40-49 | 10 |
| Minutes | 50-59 | 11 |
| Rating | <=2 | 12 |
| Rating | >=3 | 13 |
| Rating | <=4 | 14 |
| Rating | >=5 | 15 |
| Rating | <=6 | 16 |
| Rating | >=7 | 17 |
| Rating | <=8 | 18 |
| Rating | >=9 | 19 |
| Area Code | North East | 20 |
| Area Code | South East | 21 |
| Area Code | Mid West | 22 |
| Area Code | West | 23 |

FIG. 3

Bit 20    Bit 13    Bit 8    Bit 4

225a   0 0 0 1 0 0 0 0 0 0 1 0 0 0 0 1 0 0 0 1 0 0 0 0

235   X X X X 0 0 0 0 0 0 1 0 0 0 0 1 0 0 0 0 1 0 0 0

240 | 245

DATA ENCODING FOR ANALYSIS ACCELERATION

BACKGROUND

1. Field

The subject matter disclosed herein relates to data encoding and more particularly relates to data encoding for analysis acceleration.

2. Description of the Related Art

Data sets store significance amounts of information. This information can be analyzed to discover valuable trends and conditions. Unfortunately, analyzing large data sets can be very time-consuming.

BRIEF SUMMARY

A method for data encoding is disclosed. An apparatus and computer program product also perform the functions of the method. The method calculates a classification set for a data group of a data set including a plurality of entries. The classification set includes a finite plurality of classification values. Each classification value is associated with a bit position in a data binary string of a specified binary length. The method further encodes each data value of the data group for each entry with one of the plurality of classification values in a corresponding data binary string for the entry.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 3 is a table illustrating one embodiment of a classification set;

DETAILED DESCRIPTION

Figure 1:
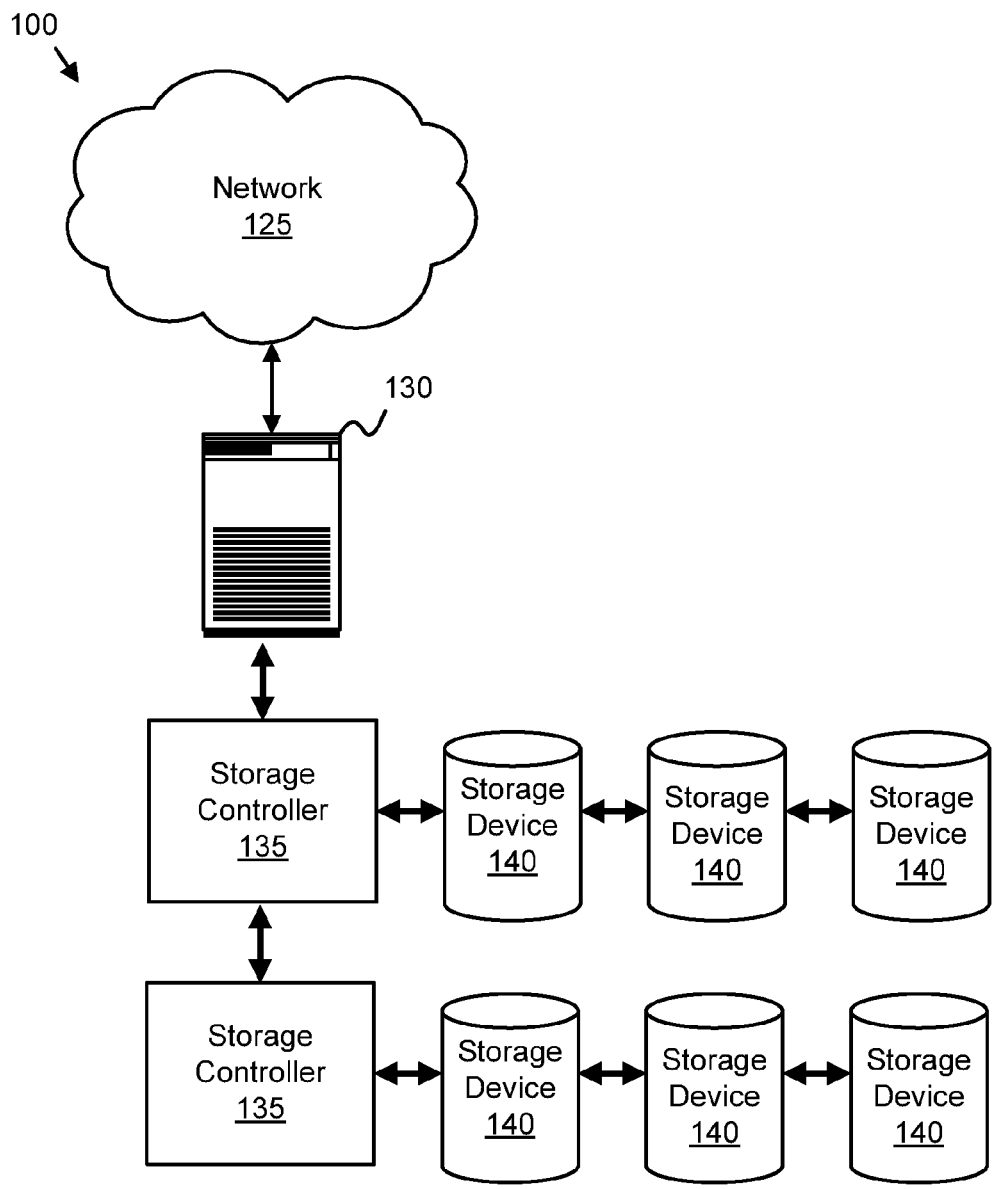
FIG. 1 is a schematic block diagram illustrating one embodiment of a data processing system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing program code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in program code and/or software for execution by various types of processors. An identified module of program code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more computer readable medium.

The computer readable medium may be a computer readable storage device. The computer readable storage medium may be a storage device storing the program code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Program code embodied on a storage device may be transmitted using any appropriate medium, including but not limited to wireless, wire line, optical fiber cable, Radio Frequency (RF), etc., or any suitable combination of the foregoing.

Program code for carrying out operations for embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by program code. These program code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Descriptions of Figures may refer to elements described in previous Figures, like numbers referring to like elements.

FIG. 1 is a schematic block diagram illustrating one embodiment of a data processing system 100. The system 100 includes a network 125, a server 130, one or more storage controllers 135, and one or more storage devices 140. The storage devices 140 may store data for a data set. The data set may be a database such as a transactional database, a relational database, an analytic database, or the like.

The server 130 may retrieve data from the storage devices 140 using the storage controllers 135. The server 130 may search, collate, process, and/or analyze the data. Alternatively, the server 130 may provide the data and/or an analysis of the data through the network 125 to another computer.

For many data sets, multiple storage devices 140 are required to store the large quantities of data that make up the data set. Unfortunately, the large quantity of data requires substantial computational bandwidth from the server 130 and/or other computer in order to analyze the data. In addition, the data of the data sets cannot easily be stored in its entirety on the server 130. As a result, significant computational bandwidth is devoted to reading data from and writing the data to the storage devices 140.

The embodiments described herein encode data for accelerated analysis. As a result, the data is analyzed in a form conducive to rapid analysis and even the largest data sets can be quickly analyzed.

Figure 2:
FIG. 2 is a schematic block diagram illustrating one embodiment of a data set.

FIG. 2 is a schematic block diagram illustrating one embodiment of a data set 205. For simplicity, the data set 205 is depicted as a two-dimensional array. One of skill in the art will recognize that data sets 205 may include any number of dimensions. The data set 205 includes one or more data groups 210. Data groups 210 may be database columns. Alternatively, the data groups 210 may be database tables, joins of one or more database tables and/or columns, unions of one or more database tables and/or columns, logical associations of data, or combinations thereof.

In one embodiment, data in each data group 210 is a consistent data type. The data type may be a value type such as values that share a characteristic. For example, data group 1 210a is depicted with color data. Data group 2 210b is depicted as having minute data. Data group 3 210c is depicted as having rating information. Data group 4 210d is depicted as having telephone number information.

In one embodiment, the data type specifies whether data values are ordinal data values or nominal data values. Ordinal data values may be continuous over a specified range including an infinite specified range. Nominal data values may be one of one or more discrete values. Nominal data values may include discrete numerical values.

The data set 205 further includes a plurality of entries 215. Entries 215 may be database rows. Alternatively, the entries 210 may be database tables, joins of one or more database tables, unions of one or more database tables, logical associations of data, or combinations thereof.

In one embodiment, each entry 215 comprises survey data from a survey respondent. The survey data may be customer experience data from a customer respondent. Alternatively, the survey data may be employee experience data from an employee respondent.

Data mining, data analysis, and similar techniques may be used to discover trends and relationships within the data, test hypothesis about the data, and otherwise draw insights from the data of the data set 205. Unfortunately, when data sets 205 are large, significant computational bandwidth is required to analyze the data sets 205. The embodiments described herein encode the data of the data set 205 for accelerated analysis as will be described hereafter.

FIG. 3 is a table illustrating one embodiment of classification sets 250. The classification sets 250 may be embodied in a database, a database table, a data structure, a flat file, or the like. The classification set 250 comprises a finite plurality of classification values 260. Each classification value 260 is associated with a bit position 265. The bit position identifies a bit within a data binary string of a specified binary length.

In the depicted embodiment, each classification set 250 includes data group values 255, classification values 260, and bit positions 265. One of skill in the art will recognize that the embodiments may be practiced with other organizations of the classification set 250.

In one embodiment, each classification set 250 is associated with one or more data groups 210. The data group values 255 specified data types. In one embodiment, all data in a data group 210 is of the same data type. A data type may have a consistent data definition, a consistent data format, a consistent binary representation of the data, or combinations thereof.

The classification values 260 may be for data values of an associated data group 210. Alternatively, the classification values 260 may be for groups of data values, ranges of data values, inequality relationships with the data value, organizations, organization subgroups, geographic areas, functional descriptions, service descriptions, need descriptions, occupational descriptions, educational descriptions, and the like.

The depicted embodiment illustrates for examples of classification sets 250. One of skill in the art will recognize that other classification sets 250 may be employed, and the depicted classification sets 250 are not limiting. A first classification set 250a comprises color data. The classification values 260 for the first classification set 250a include all colors in data group 1 210a. Thus there may be unique classification values 260 for each possible data value in a data group 210.

A second classification set 250b comprises minute data. The classification values 260 for the second classification set 250b are groups of possible data values. A mapping table may map individual data values into group data values. In the depicted embodiment, the classification values 260 for the second classification set 250b are numerical ranges. Groupings may also be arbitrarily defined. In addition groupings may be of organizational names, geographic areas, functional names, service names, need names, occupational names, educational background names, and the like.

A third classification set 250c comprises rating data. The classification values 260 for the third classification set 250c are inequalities. In the depicted embodiment, the ratings are for a scale of 1-10. The classification values 260 include inequalities for each rating between 1 and 10. In one embodiment, an inequality with a lowest numerical value is selected. Alternatively, an inequality with a highest numerical value may be selected. In a certain embodiment, each true inequality is selected.

A fourth classification set 250d comprises geographic data. The classification values 260 for the fourth classification set 250d are geographic regions. In one embodiment, a mapping table may map geographic data such as the geographic data in telephone area codes into groups such as the geographic regions.

A bit position 265 is assigned to each classification value 260. In one embodiment, each classification value 260 is associated with a unique bit position 265. The number of bit positions 265 may be for a binary string of a specified binary length such as 32 bits. In a certain embodiment, a number of bit positions 265 in the classification set 250 is limited to a number of bits in a data word of the server 130 and/or computer. For example, the number of bit positions 265 may be limited to 64 bits for 64-bit processors.

The classification set 250 is used to encode each data value of each entry 215 of the data set 205 into a data binary string. The data binary strings may then be analyzed as will be described hereafter. By analyzing the data binary strings of entries 215 rather than the entries 215, the analysis of the data set 205 is accelerated.

Figures 4, 5, 6:
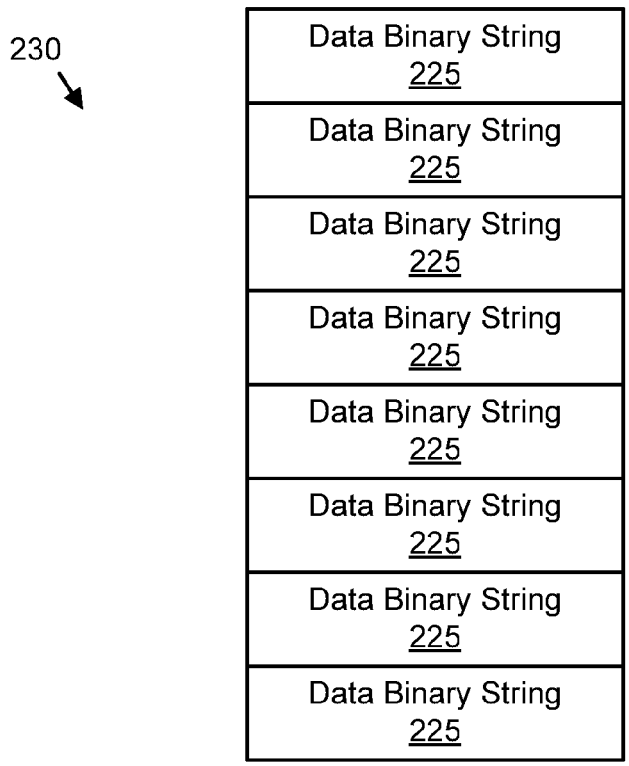
FIG. 4 is a word illustration of one embodiment of a data binary string.
FIG. 5 is a schematic block diagram illustrating one embodiment of an encoded data set.
FIG. 6 is a word illustration of one embodiment of a search template.

FIG. 4 is a word illustration of one embodiment of a data binary string 225. The data binary string 225 is encoded from an entry 215 in the data set 205 using the classification sets 250. In the depicted embodiment, entry 1 215a of the data set 205 of FIG. 2 is encoded. Entry 1 215a includes a data value of "Brown" for data group 1 210a. The data value "Brown" is encoded by setting bit 4 in the data binary string 225. The data value of "14" for data group 2 210b is encoded by setting bit 8 in the data binary string 225 as 14 is in the range of 10-19 minutes. The data value of "3" for data group 3 210c is encoded by setting bit 13 in the data binary string 225. The data value of "(201) 797-2093" for data group 4 210d is encoded by setting bit 20 in the data binary string 225 to indicate a northeast region.

Classification values 260 that are not encoded are represented as zeros in the data binary string 225. In an alternative embodiment, classification values 260 are encoded by setting bits to zero and classification values 260 that are not encoded are represented as binary ones.

The data binary string 225 may have a specified binary length. The specified binary length may be a data word length. Alternatively, the specified binary length may be calculated as a function of a data set size and a desired analysis speed expressed as a time interval as will be described hereafter.

FIG. 5 is a schematic flow chart diagram illustrating one embodiment of an encoded data set 230. The encoded data set 230 includes a plurality of data binary strings 225. In one embodiment, each entry 215 of the data set 205 is encoded as a data binary string 225 and appended to the encoded data set 230. The encoded data set 230 is a simplified version of the data set 205 that can rapidly be compared with a search template, tabulated, or otherwise analyzed. As a result, using the encoded data set 230, very large data sets 205 can be rapidly analyzed.

FIG. 6 is a word illustration of one embodiment of a search template 235. In one embodiment, the search template 235 is the specified binary length of the data binary string 225. Bits of the search template 235 may be set corresponding to desired classification values 260.

In the depicted embodiment, the search template 235 is configured to identify data binary strings 225 representing entries 215 with a data value of "Brown" for data group 1 210a, "14" for data group 2 210b, and "3" for data group 3 210c. In one embodiment, the search template 235 includes must match values 245 and don't care values 240. Bits of the data binary string 225 must be equivalent to the must match values 245 for the data binary string 225 to match the search template 235. Bits of the data binary string 225 can be any value to match the don't care values 240.

Figure 7:
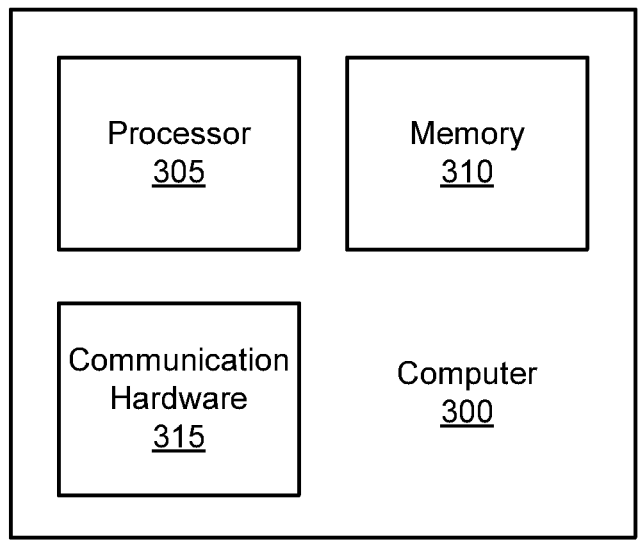
FIG. 7 is a schematic block diagram illustrating one embodiment of a computer.

FIG. 7 is a schematic block diagram illustrating one embodiment of the computer 300. The computer 300 may be embodied in the server 130. The computer 300 includes a processor 305, a memory 310, and communication hardware 315. The memory 310 may be a semiconductor storage device, a hard disk drive, an optical storage device, a micromechanical storage device, or combinations thereof. The memory 310 may store program code. The processor 305 may execute the program code. The communication hardware 315 may communicate with other devices.

Figure 8:
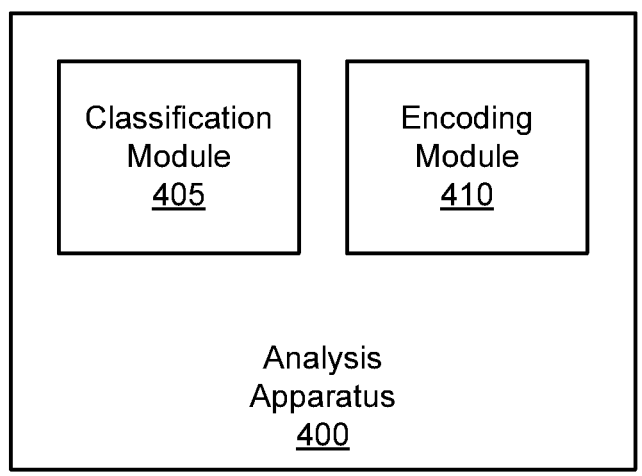
FIG. 8 is a schematic block diagram illustrating one embodiment of an analysis apparatus.

FIG. 8 is a schematic block diagram illustrating one embodiment of an analysis apparatus 400. The analysis apparatus 400 may be embodied in the computer 300. In one embodiment, the analysis apparatus 400 is embodied in the server 130. The analysis apparatus 140 includes a classification module 405 and encoding module 410.

The classification module 405 and encoding module 410 may be embodied in a computer readable storage medium such as the memory 310. Alternatively, the classification module 405 and the encoding module 410 may be embodied in hardware such as semiconductor gates. In addition, the classification module 405 and encoding module 410 may be embodied and combinations of one or more computer readable storage medium and hardware.

The classification module 405 calculates a classification set 250 for a data group 210 of the data set 205. In addition, the classification module 405 may calculate the classification sets 250 for a plurality of data groups 210. The encoding module 410 encodes each data value of the data group 210 for each entry 215 with one of the plurality of classification values 260 in the data binary string 225.

Figure 9:
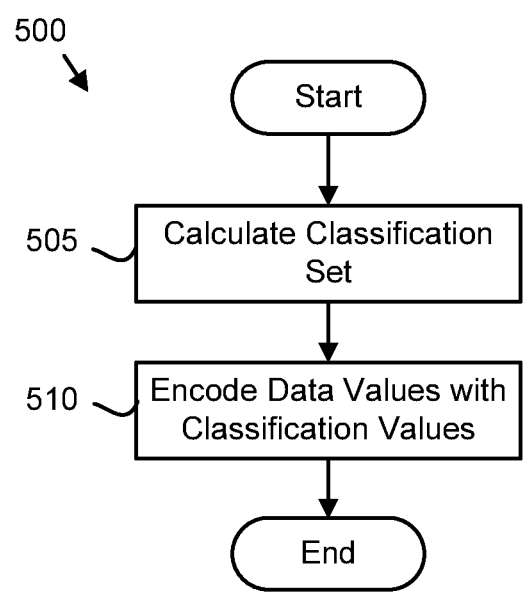
FIG. 9 is a schematic flow chart diagram illustrating one embodiment of a data encoding method.

FIG. 9 is a schematic flow chart diagram illustrating one embodiment of a data encoding method 500. The method 500 may be performed by the processor 305. Alternatively, the method 500 may be performed by a computer readable storage medium such as the memory 310. The computer readable storage medium may store program code that is executed by the processor 305 to perform the method 500.

The method 500 starts, and in one embodiment, the classification module 405 calculates 505 a classification set 250 for one or more data groups 210 of the data set 205. The classification set 250 comprises a finite plurality of classification values 260. In one embodiment, the classification module 405 creates ranges of data values and/or groups of data values as will be described hereafter. Alternatively, the classification module 405 may create a classification value 260 for each distinct data value.

The encoding module 410 encodes 510 each data value of the data group 210 for each entry 215 with one of the plurality of classification values 260 in the data binary string 225 and the method 500 ends. Data values for in entry 215 may be encoded 510 as illustrated in FIG. 4.

Figure 10:
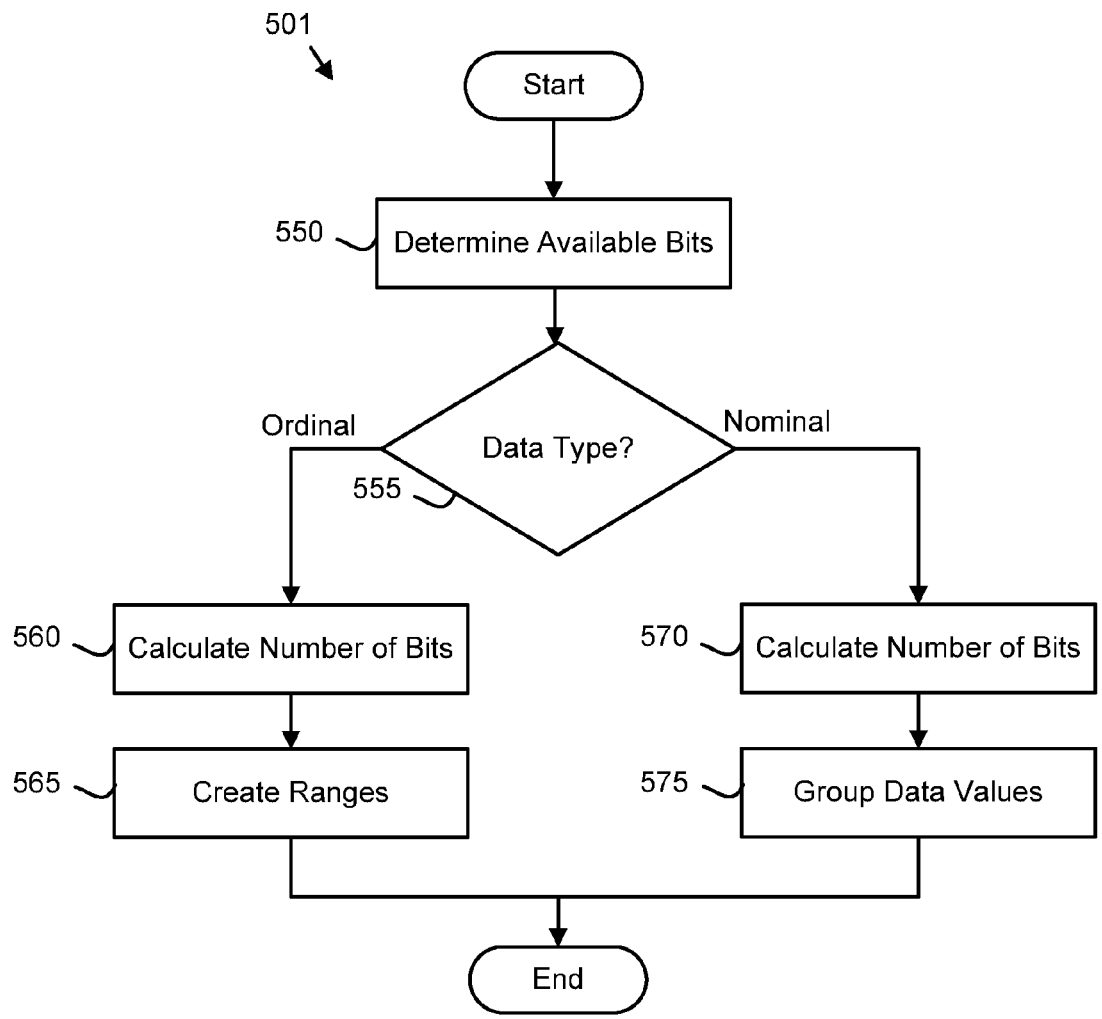
FIG. 10 is a schematic flow chart diagram illustrating one embodiment of a classification set calculation method.

FIG. 10 is a schematic flow chart diagram illustrating one embodiment of a classification set calculation method 501. The method 501 may embody step 505 of FIG. 9. The method 501 may be performed by the processor 305. Alternatively, the method 501 may be performed by a computer readable storage medium such as the memory 310. The computer readable storage medium may store program code that is executed by the processor 305 to perform the method 501. For simplicity, the method 501 is described for a single data group 210. The method 501 may be repeated to generate the classification set 250 for a plurality of data groups 210.

The method 501 starts, and in one embodiment the classification module 405 determines 550 a number of available bits for the data binary string 225. In one embodiment, the number of available bits is the length of the data word. For example, the number of available bits may be 128 for a computer 300 with a processor 305 using 128 bit data words. Alternatively, the number of available bits is an integer multiple of the length of the data word. In a certain embodiment, the number of available bits is an integer multiple of a specified number of bytes. For example, a specified number of bytes may be 10 bytes and the number of available bits may be 80 bits.

In one embodiment, the number of available bits may be a function of a data set size and desired performance. The desired performance may be a time interval for analyzing the data set 205. A number of available bits may be calculated using Equation 1, where AB is the number of available bits, S is a data set size, T is the time interval for analyzing the data set 205, and K is a nonzero constant.

$$AB = kT/S \qquad \text{Equation 1}$$

In one embodiment, AB is increased or decreased to the nearest integer multiple of the length of the data word. For example, if AB is calculated as 72, AB may be decreased to 64. Alternatively, AB may always be increased to the nearest integer multiple of the length of the data word.

The classification module 405 further determines 555 the data type of the data group 210. In the depicted embodiment, the classification module 405 determines 555 whether the data type is an ordinal data type or nominal data type.

If the data type is an ordinal data type, the classification module 405 calculates 560 a number of bits for the data group 210. The number of bits for the data group 210 is less than or equal to the number of available bits. In one embodiment, the number of bits for the data group 210 is a function of the total number of data groups 210 and the complexity of each data group 210.

In a certain embodiment, the complexity C of the data group 210 is calculated using Equation 2, where TR is a total range of the data group 210, and DG is a desired granularity for results from the data group 210. The total range and the desired granularity may be expressed in numerical ranges, numbers of distinct values, or combinations thereof.

$$C = TR/DG \qquad \text{Equation 2}$$

In one embodiment, the number of bits B for a first data group 210a as calculated using Equation 3, where C1 is the complexity of the first data group 210a, ΣC is the sum of the complexity for all data groups 210, and j is a non-zero constant.

$$B = jC1/\Sigma C \qquad \text{Equation 3}$$

Alternatively, a user may specify the number of bits for the first data group 210a. In one embodiment, the user may specify a percentage of the available bits for the number of bits for the first data group 210a.

The classification module 405 may further create 565 ranges for the ordinal values of the data group 210 and the method 501 ends. The number of ranges is equal to the number of bits for the data group 210. In one embodiment, the ranges are linear ranges with equivalent numerical spans. For example, each range may have a length of 10. Alternatively, the ranges are Gaussian ranges with equivalent standard deviations. For example, each range may have a length of 0.5 standard deviations.

Alternatively, a configuration table may specify the ranges. The configuration table may be maintained by a user.

If the data type is a nominal data type, the classification module 405 calculates 570 a number of bits for the data group 210. The number of bits for the data group 210 is less than or equal to the number of available bits. In one embodiment, the number of bits for the data group 210 is a function of the total number of data groups 210 and the complexity of each data group 210. For example, Equations 2 and 3 may be used to calculate the number of bits for the data group 210.

Alternatively, the number of bits may be calculated 570 as a function of the number of distinct data values for the data group 210. For example, the number of bits may be calculated using Equation 4, where TD is the total number of distinct data values in the data group 210 and m is a nonzero constant.

$$B = TD/m \qquad \text{Equation 4}$$

Alternatively, a user may specify the number of bits for the first data group 210a. In one embodiment, the user may specify a percentage of the available bits for the number of bits for the first data group 210a.

The classification module 405 may further group 575 data values of the data group 210 into one or more classification values 260 and the method 501 ends. In one embodiment, the classification module 405 creates classification values 265 equal to the number of bits allocated to the data group 210. The classification module 405 may further divide data values among the classification values 265. In one embodiment, the user assigns data values to the classification values 265.

Data values may also be automatically assigned to classification values 265. In one embodiment, data values are assigned to classification values 265 as a function of data values in other data groups 210. For example, different data values of the first data group 210a, such as "black" and "red" in FIG. 2, are grouped together if the data values of other data groups 210 for in entries 215 including "black" and "red" are equivalent.

Alternatively, a configuration table may specify the groups. The configuration table may be maintained by a user.

Figure 11:
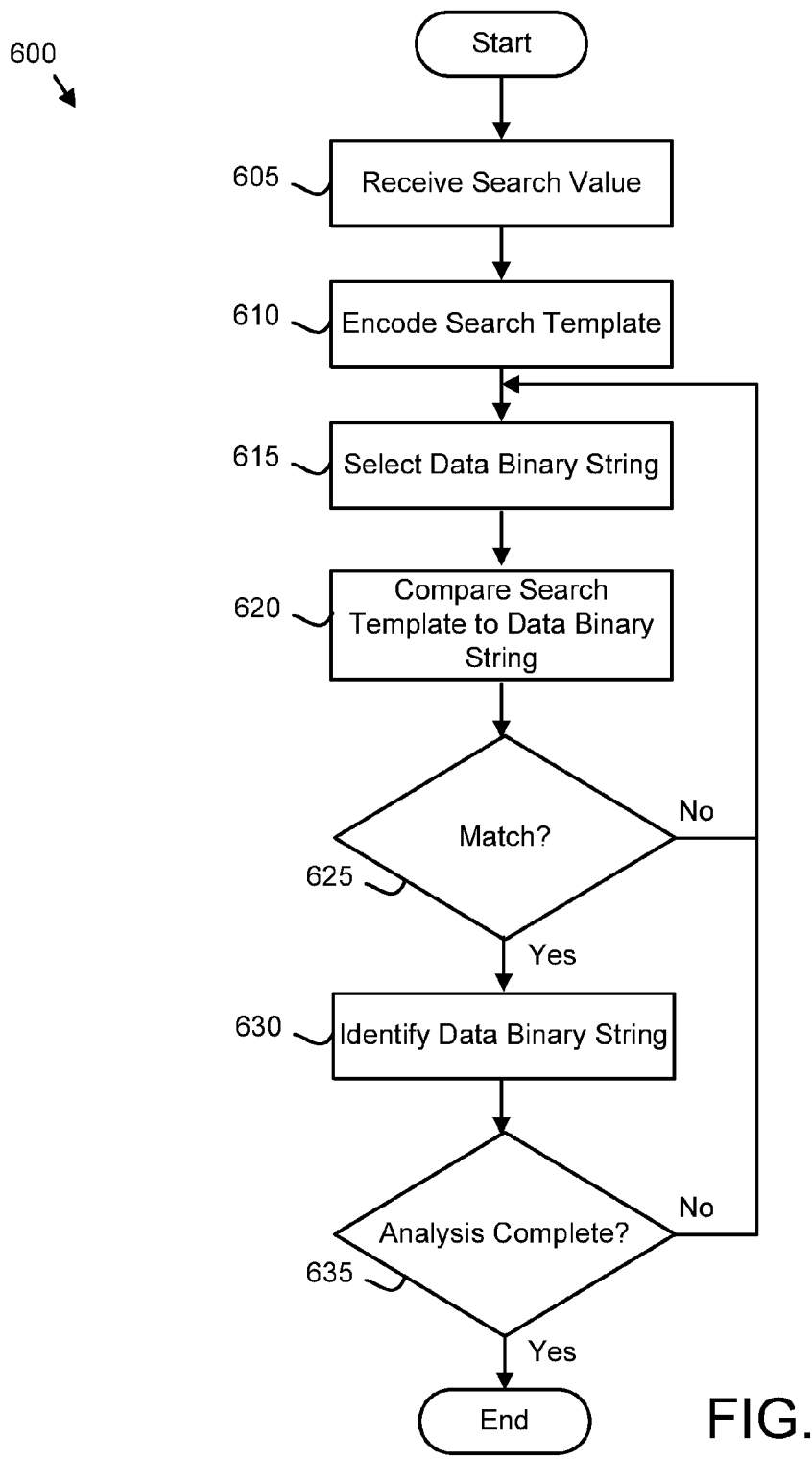
FIG. 11 is a schematic flow chart diagram illustrating one embodiment of an encoded data analysis method.

FIG. 11 is a schematic flow chart diagram illustrating one embodiment of encoded data analysis method 600. The method 600 may be performed by the processor 305. Alternatively, the method 600 may be performed by a computer readable storage medium such as the memory 310. The computer readable storage medium may store program code that is executed by the processor 305 to perform the method 600.

The method 600 starts, and in one embodiment, the encoding module 410 receives 605 a search value. The search value may comprise search terms corresponding to one or more of the data groups 210. The search terms may be text strings, numerical values, inequalities, or combinations thereof.

The encoding module 410 encode 610 the search value into a search template 235. The search value may be encoded 610 into the search template 235 using the classification set 250 as illustrated in FIG. 6.

The encoding module 410 further selects 615 a data binary string 225 from the encoded data set 230 and compares 620 the search template 235 to the data binary string 225. The encoding module 410 may further determine 625 if the data binary string 225 matches the search template 235. In one embodiment, the data binary string 225 matches the search template 235 if bits of the binary data string 225 corresponding to the must match values 245 of the search template 235 are equivalent.

If the data binary string 225 does not match the search template 235, the encoding module 410 selects 615 another data binary string 225. If the data binary string 225 matches the search template 235, the encoding module 410 identifies 630 the data binary string 225.

In one embodiment, the data binary string 225 is identified 630 by tabulating an accounting value such as one and/or one or more data values with previous search totals for the encoded data set 230. The search totals may indicate a number of data binary strings 225, and thus entries 215, matching the search template 235.

Alternatively, the data binary string 225 identified by including the data binary string 225 in an output set. The output set may be appended with the entry 215 corresponding to the data binary string 225. Alternatively, the each data binary string 225 in the output set may be replaced with the corresponding entry 215.

The encoding module 410 further determines 635 if the analysis of the encoded data set 230 is complete. The analysis of the encoded data set 230 may be complete when each data binary string 225 is compared 620 to the search template 235. If the analysis is not complete, the encoding module 410 selects 615 another data binary string 225. If the analysis is complete, the method 600 ends.

By calculating the classification set 250 for each data group 210 of the data set 205 and then using the classification set 250 to encode each data value of the data group 210 for each entry 215 with classification values 260 into the data binary string 225, the data set 205 is encoded into the encoded data set 230. The encoded data set 230 may then be analyzed faster, including orders of magnitude faster, than the data set 205. As a result, even the largest data sets 205 may be rapidly analyzed as encoded data sets 230.

The embodiments support rapid real-time interactive analysis of the data set 205. The encoded data set 230 corresponding to the may be rapidly analyzed, and then the results, such as search totals or an output set, associated with the original data values and presented.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   calculating, by use of a processor, a classification set for a data group of a data set comprising a plurality of entries, wherein the classification set comprises a finite plurality of classification values and each classification value is associated with a bit position for a data binary string of a specified binary length; and
   encoding each data value of the data group for each entry with one of the plurality of classification values in a corresponding data binary string for the entry.

2. The method of claim 1, wherein each data value is encoded by setting a bit in the associated bit position of the classification value for the data value.

3. The method of claim 1, further comprising:
   encoding a search template for a search value using the classification set; and
   comparing the search template to each data binary string.

4. The method of claim 3, further comprising identifying each data binary string matching the search template.

5. The method of claim 1, wherein the classification values comprise a range of data values for ordinal data.

6. The method of claim 1, wherein the classification values are nominal data values for nominal data.

7. The method of claim 6, wherein the classification values comprises groups of data values for nominal data.

8. The method of claim 1, wherein the classification values are inequalities for rating data.

9. The method of claim 1, wherein data set comprises survey data.

10. The method of claim 9, wherein the survey data is customer experience data.

11. The method of claim 9, wherein the survey data is employee experience data.

12. An apparatus comprising:
   a non-transitory memory storing program code executable by a processor, the program code comprising:
   a classification module calculating a classification set for a data group of a data set comprising a plurality of entries, wherein the classification set comprises a finite plurality of classification values and each classification value is associated with a bit position for a data binary string of a specified binary length; and
   an encoding module encoding each data value of the data group for each entry with one of the plurality of classification values in a corresponding data binary string for the entry.

13. The apparatus of claim 12, wherein each data value is encoded by setting a bit in the associated bit position of the classification value for the data value.

14. The apparatus of claim 12, the encoding module further encoding a search template for a search value using the classification set;
   comparing the search template to each data binary string; and
   identifying each data binary string matching the search template.

15. The apparatus of claim 12, wherein the classification values comprise a range of data values for ordinal data and nominal data values for nominal data.

16. The apparatus of claim 12, wherein the classification values are inequalities for rating data.

17. A program product comprising a non-transitory computer readable storage medium storing program code executable by a processor to perform:
   calculating a classification set for a data group of a data set comprising a plurality of entries, wherein the classification set comprises a finite plurality of classification values and each classification value is associated with a bit position for a data binary string of a specified binary length; and
   encoding each data value of the data group for each entry with one of the plurality of classification values in a corresponding data binary string for the entry.

18. The program product of claim 17, wherein each data value is encoded by setting a bit in the associated bit position of the classification value for the data value.

19. The program product of claim 17, the program code further:
   encoding a search template for a search value using the classification set;
   comparing the search template to each data binary string; and
   identifying each data binary string matching the search template.

20. The program product of claim 17, wherein the classification values comprise a range of data values for ordinal data and nominal data values for nominal data.

* * * * *